United States Patent [19]

Naimpally et al.

[11] Patent Number: 5,477,397
[45] Date of Patent: Dec. 19, 1995

[54] DIGITAL HIGH DEFINITION TELEVISION RECEIVER WITH FEATURES THAT FACILITATE TRICK-PLAY MODES ON A DIGITAL VCR

[75] Inventors: Saiprasad V. Naimpally, Langhorne, Pa.; Hee-Yong Kim, Plainsboro, N.J.

[73] Assignee: Matsushita Electric Corporation of America, Secaucus, N.J.

[21] Appl. No.: 73,789

[22] Filed: Jun. 8, 1993

Related U.S. Application Data

[63] Continuation-in-part of Ser. No. 21,248, Feb. 23, 1993, abandoned.

[51] Int. Cl.$^6$ ..................................................... H04N 5/78
[52] U.S. Cl. ............................ 360/10.3; 360/18; 360/24; 360/33.1; 358/335; 348/390; 348/553
[58] Field of Search ................................. 360/33.1, 10.3, 360/24, 31, 18, 20; 358/12, 140, 141, 335, 310; 348/558, 390, 399, 403, 553

[56] References Cited

U.S. PATENT DOCUMENTS

| | | | |
|---|---|---|---|
| 4,730,222 | 3/1988 | Schauffele | 360/33.1 X |
| 4,825,301 | 4/1989 | Pape et al. | 360/33.1 X |
| 4,931,855 | 6/1990 | Salvadorini | 358/12 |
| 4,941,055 | 7/1990 | Fujimoto | 360/33.1 X |
| 5,010,392 | 4/1991 | Croll | 348/558 X |
| 5,055,927 | 10/1991 | Keesen et al. | 358/141 |
| 5,122,875 | 6/1992 | Raychaudhuri et al. | 358/133 |
| 5,136,380 | 8/1992 | Cho | 358/12 X |
| 5,136,391 | 8/1992 | Minami | 360/10.3 X |
| 5,260,783 | 11/1993 | Dixit | 358/136 |
| 5,262,854 | 11/1993 | Ng | 358/133 |
| 5,317,396 | 5/1994 | Fujinami | 348/390 |

FOREIGN PATENT DOCUMENTS

| | | |
|---|---|---|
| 0353758 | 2/1990 | European Pat. Off. . |
| 0505985 | 9/1992 | European Pat. Off. . |
| 0606857 | 7/1994 | European Pat. Off. . |
| 0177292 | 7/1989 | Japan ........................... 360/33.1 |

OTHER PUBLICATIONS

Coded representation of picture and audio information Jul. 25, 1990, Maxim Picture Experts Group of ISO.

C. Yamamitsu, et al., "A Study on Trick Plays for Digital VCR," *IEEE Transactions on Consumer Electronics*, vol. 37, No. 3, at pp. 261–266 (Aug. 1991).

Je H. Lee, et al., "A Study on New DCT–Based Bit Rate Reduction Algorithm and Variable Speed Playback for a Home–Use Digital VCR," vol. 38, No. 3, at pp. 236–241 (Aug. 1992).

"Digital HDTV Records–The Next Best Thing To Being There," *Popular Science*, at p. 61 (Apr. 1992).

Primary Examiner—Andrew L. Sniezek
Attorney, Agent, or Firm—Ratner & Prestia

[57] ABSTRACT

A high-definition television receiver includes circuitry to decode a received high-definition television signal to produce a digital data stream representing the corresponding high-definition television image. In addition, the receiver includes circuitry which generates a signal representing a reduced resolution image from the decoded data stream. The receiver provides both the high-definition television signal and the reduced resolution signal at an output port. A video tape recorder (VTR) receives the two signals, segments them and formats them onto the tape in a manner which allows a majority of the reduced resolution segments to be recovered and displayed in at least one of the VTR's trick-play modes. The reduced resolution image may be from the same channel or from a different channel and may also be displayed as an inset picture (PIX-IN-PIX) in the main high-definition image.

8 Claims, 8 Drawing Sheets

DIGITAL HIGH DEFINITION TELEVISION RECEIVER WITH FEATURES THAT FACILITATE TRICK-PLAY MODES ON A DIGITAL VCR

This application is a continuation-in-part of application Ser. No. 08/021248 entitled DIGITAL HIGH DEFINITION TELEVISION VIDEO RECORDER WITH TRICK-PLAY FEATURES which was filed on Feb. 23, 1993 now abandoned.

BACKGROUND OF THE INVENTION

The present invention concerns high definition television receivers and in particular a receiver which processes a received high definition video signal to produce data representing both a high resolution image and a low resolution image for recording by a VCR.

Digital high definition television production schemes have been under development for several years. These schemes typically produce higher quality television images and sound than conventional television systems. To do this, these systems convey more information than is conveyed in a conventional television signal.

Recent regulations issued by the Federal Communications Commission (FCC), however, require that this larger amount of information be sent within the same band of frequencies as a conventional television signal. To fit the relatively large bandwidth High Definition Television (HDTV) signal into a standard television channel, the information content of the HDTV signal must be compressed.

Because of the relatively large degree of spatial redundancy and temporal redundancy in the HDTV signals, relatively high levels of data compression can be achieved for most television signals.

One such compression method, by which spatial redundancy is removed from a television signal, generates discrete cosine transform representations of blocks of the image. This representation resolves an image frame into coefficient values representing its various spatial frequency components. Portions of an image which are the same from pixel to pixel or which exhibit a repetitive pattern are resolved from many pixel values to a relatively small number of frequency coefficient values. In addition, since the human eye is less sensitive to quantization errors in image components having high spatial frequencies than in image components having relatively low spatial frequencies, the high spatial frequency coefficients may be quantized more coarsely than the low spatial frequency coefficients to further reduce the amount of data used to represent the image.

Temporal redundancy in an image may be removed by encoding only the areas of a given frame which are different from corresponding areas of a previously encoded frame. This is generally known as predictive coding. Temporal redundancy can be further exploited to achieve even higher levels of data compression by performing motion compensation. Using this scheme, before a image block is encoded, the blocks surrounding it in a previously encoded frame are searched for the one block which most closely matches the block in the current frame. The current block is then subtracted from the matching block in the previous frame and only the difference values are encoded.

An exemplary video image compression system which employs motion-compensated predictive encoding techniques is that proposed by the Motion Picture Experts Group (MPEG) and described in the document entitled "Coded Representation of Picture and Audio Information" ISO-IEC/JTC1/SC2/WG11 N0010 MPEG 90/41 dated Jul. 25, 1990.

Other encoding techniques are also used in the MPEG system such as run-length coding, in which strings of identical values are encoded as a smaller number of values; and variable length coding, in which frequently occurring data values are assigned a digital code value having fewer bits than less frequently occurring data values.

Whatever encoding technique is used the HDTV signal must be decoded before it can be displayed. For predictively encoded or motion compensated predictively encoded HDTV signals, the decoding apparatus may include one or more frame memories which hold images that have already been decoded. The pixel values held by these memories are used to reconstruct the predictively encoded data in the current frame.

Using MPEG encoding techniques, HDTV signals having a data rate of between 600 and 1200 megabits per second (Mbps) can be compressed to produce a signal having a data rate of less than 20 Mbps. As with other terrestrial broadcast signals, consumers will want to be able to receive, display and record signals representing high resolution video images with little no loss of resolution.

On first analysis, the compression of HDTV signals should be beneficial for recording the signals on home use Video Cassette Recorders (VCR's), since these units typically have only a limited bandwidth available for recording video signals. For example, a paper by C. Yamamitsu et al. entitled "A Study on Trick-plays For Digital VCR", *IEEE Transactions on Consumer Electronics,* Volume 37, No. 3, August, 1991, pp. 261–266, discloses a home use VCR having a recording rate of 27 megabits per second (Mbps). A typical HDTV signal, prior to encoding, has a bit-rate of 600 Mbps. Compression methods such as MPEG can reduce these HDTV signals to have a bit-rate of approximately 18 Mbps without noticeably degrading the image quality when the compressed signal is expanded.

The problem with predictively encoded HDTV signals does not occur in recording or in normal playback modes but in trick-play modes such as fast-forward and reverse in which the video image is displayed at a higher rate than that at which it was recorded.

The following is a description of the problem. Video information is recorded on a VCR in data blocks referred to as slices, which represent fixed-size portions of an image. As described above, some slices are encoded using intra-frame techniques while others are encoded using predictive techniques. The data blocks representing the slices are recorded as they occur in the video data stream. The amount of data in a slice may vary from slice-to-slice. This variation occurs because of the relative coding efficiencies of the slices in the original HDTV signal. Slices which represent still portions of a multi-frame image or which represent portions having relatively little variation may be encoded using a relatively small number of data values. Image portions containing a high level of detail and having no corresponding portions in previously encoded frames may require a significantly larger number of data values when they are encoded.

When the image signals are read from the tape during normal playback each slice of each frame is read from the tape in sequence. If the coding method which produced the HDTV signals used predictive coding techniques the recorded data includes both intra-frame coded data and predictively coded data. In normal playback as the data is removed from the tape the pixel values for the intra-frame encoded portions are stored in a memory and are available for use in reconstructing the predicted frames.

In a fast-forward trick-play mode, however, not all of the slices are recovered. If some of the slices that are not recovered are from an intra-coded frame, then their data values will not be available when corresponding predictively encoded slices are read from the tape. Consequently it may not be possible to properly reconstruct the predicted frame for display.

Because of the difficulties of recovering predicted frames in trick-play modes most of the proposed methods for recording digitally compressed (bit-rate reduced) signals have restricted the encoding techniques that are used to encode data for recording on video tape recorders (VTR's), including VCR's, to exclude predicted frames. Exemplary systems of this type are described in an article by C. Yamamitsu, et al. entitled "An Experimental Study for a Home-Use Digital VTR", *IEEE Transactions on Consumer Electronics,* Volume 35, No. 3, August 1989, pp. 450–457, and in a paper by J. Lee et al., entitled "A Study on New DCT-Based Bit Rate Reduction Algorithm and Variable Speed Playback For A Home-Use Digital VCR", *IEEE Transactions on Consumer Electronics,* Volume 38, No. 3, August 1992, pp. 236–242. As described above, since these systems do not use predicted frames, they cannot compress data with the efficiency of a system which does use predicted frames. Consequently, for the same compression ratios, they cannot achieve the same levels of detail in the reproduced image as a system, such as MPEG, which uses motion-compensated predictive coding techniques.

SUMMARY OF THE INVENTION

The present invention is embodied in a digital television receiver which decodes a received high-definition television signal to produce data representing a low resolution image. Data representing both the high resolution image and the low resolution image is provided by the television receiver at an output port.

According to one aspect of the invention, the high-resolution and low-resolution data streams are provided to a digital VCR. The VCR interleaves the data representing the low resolution image with the data representing the high resolution image in such a manner that a substantial portion of the data representing the low resolution image can be recovered by the VCR in a predetermined trick-play mode.

According to another aspect of the invention the receiver includes a single high definition television decoder which is used to produce the low resolution image data and to produce the high resolution video display of the television receiver.

According to yet another aspect of the invention, the television receiver includes a separate low resolution decoder which is used to produce the low resolution image data. This low resolution image data is also used by the television receiver to produce a picture-in-picture (PIP) display.

DETAILED DESCRIPTION

Overview

Each of the television receivers described below, which embody the present invention, produce two separate data streams. One data stream represents an HDTV video signal which has been encoded using both intra-frame and motion compensated encoding techniques. The second data stream represents a low resolution image which is sufficient for display in trick-play modes and which may be efficiently compressed to a relatively small number of data values using only intra-frame encoding techniques.

The two data streams are provided by the television receiver either as a single multiplexed stream or as two independent streams. In the VCR, each of the data streams is separated into relatively small data segments which are time-division-multiplexed for recording on the tape. The segments of at least one of the data streams are identified by a header. In the exemplary embodiment of the invention, the low resolution segments have fixed minimum and maximum lengths and recorded at predetermined locations on the tape. These locations are selected to be in the path of the tape head during selected trick-play modes.

Two alternative trick-play display modes are disclosed. In the first mode, a rotating segment from each frame is displayed to produce a complete image composed of different parts of each frame. In the second mode, images from single frames are displayed but only for selected frames in the sequence of frames (e.g. every third frame).

Data representing the full compressed image is also recorded on the tape so that, in normal play modes, a complete high definition image may be recovered and displayed.

DETAILED DESCRIPTION OF THE EXEMPLARY EMBODIMENTS

Figure 1:
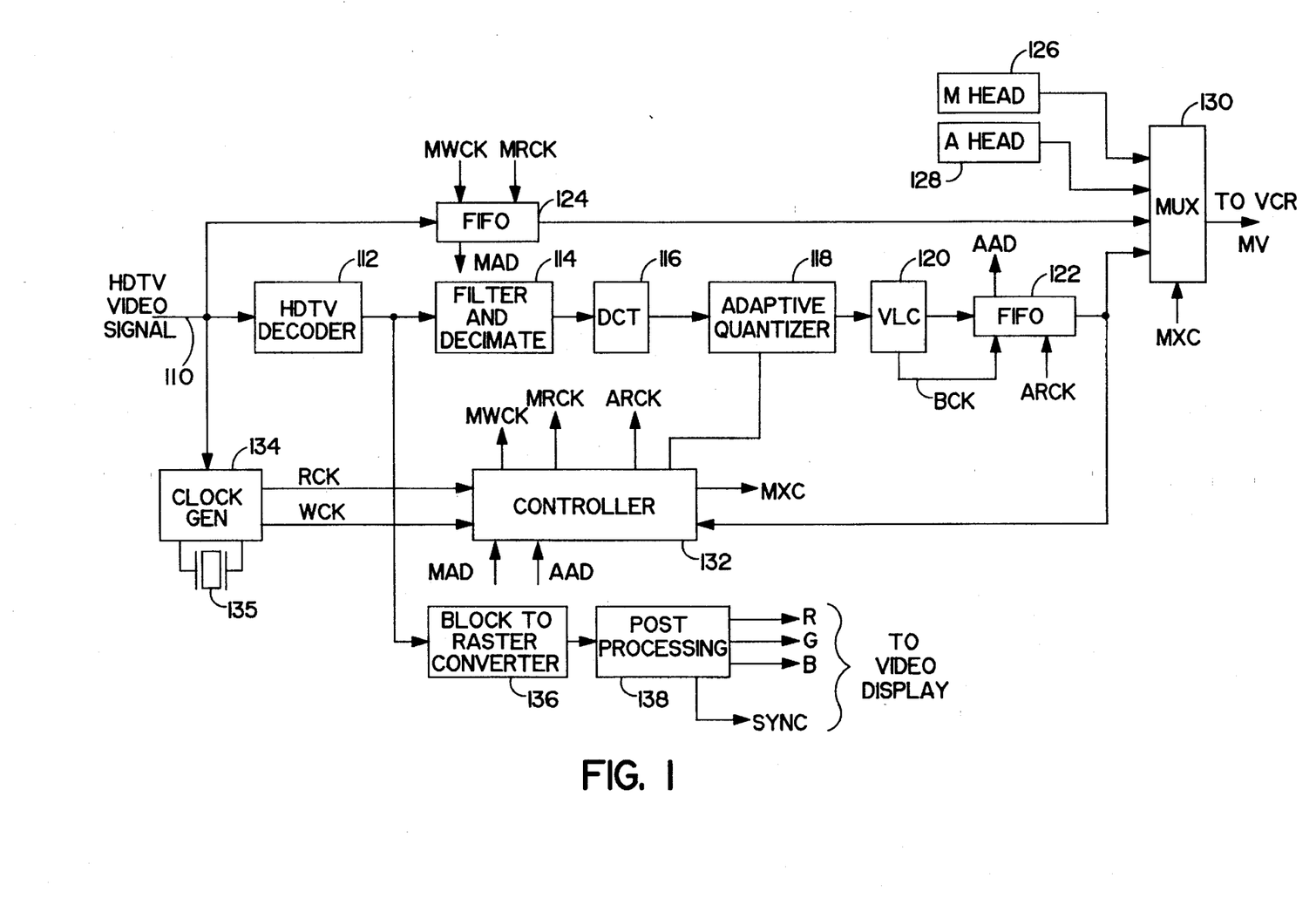
FIG. 1 is a block diagram of a television receiver which includes an exemplary embodiment of the invention.

FIG. 1 is a block diagram of a television receiver in accordance with a first exemplary embodiment of the invention. In this embodiment, a digital data stream representing a baseband HDTV video signal is received at terminal 110. This data stream may be provided, for example, by a television tuner (not shown) followed by a demodulator/ decoder (not shown) which recovers a 32 state quadrature amplitude modulated (32-QAM) signal.

This data stream is applied in parallel to a conventional HDTV decoder 112, a first-in-first-out (FIFO) memory 124 and to a clock generator 134. The HDTV decoder 112 is the main decoder for the television receiver. If the HDTV video signal is encoded according to the motion-picture experts group (MPEG) standard, then the HDTV decoder 112 may include circuitry (not shown) to expand run length encoded and variable length encoded data, circuitry (not shown) to reverse the adaptive quantization applied in the MPEG encoding process, an inverse discrete cosine transform (IDCT) decoder (not shown), and a frame memory (not shown) for reversing any motion compensated encoding which may have been performed in the MPEG encoder.

The exemplary HDTV encoder 112 produces blocks of pixel values representing a high definition video image. In this embodiment of the invention, these blocks may include 64 pixels arranged in an 8×8 matrix.

To produce a high definition television image, the blocks of pixel values are applied to a block to raster converter 136. This circuit, which may include a frame memory buffer (not shown), produces pixel values in raster scan order which are applied to post processing circuitry 138. The circuitry 138 uses well known techniques to process the raster scan pixel values provided by the circuitry 136 to generate analog red (R) green (G) and blue (B) signals and to regenerate horizontal and vertical synchronization signals (SYNC). These signals are used to drive a video display (not shown) to reproduce the high definition image sequence.

The blocks of pixel values provided by the decoder 112 are also applied to circuitry 114 which low pass filters and subsamples or decimates the blocks of pixel values to produce pixel values representing a reduced resolution image. In the exemplary embodiment of the invention the blocks of pixel values are subsampled by a factor of ½ in each of the horizontal and vertical directions. Accordingly, each block of 64 pixels which is applied to the filter and decimate circuitry 114 produces a block of 16 pixels. The low-pass filter component of the block 114 acts as an antialiasing filter.

These 16 pixel blocks reblocked into 64 pixel blocks which are applied to a discrete cosine transform circuit 116. As in the MPEG encoding standard the DCT block 116 transforms the pixel values in each block into a block of coefficient values each representing a respectively different spatial frequency component of the block of pixel values. The blocks of coefficient values produced by the DCT 116 are applied to adaptive quantization circuitry 118. This circuitry adjusts the quantization resolution (i.e. number of bits) used to represent each of the DCT coefficients in response to a signal provided by a controller 132. To generate this signal the controller 132 monitors the volume of data produced in the process of encoding the reduced resolution image.

After the adaptive quantization step, the quantized coefficient values are applied to a variable length coder 120. The coder 120 includes both run length encoding circuitry, which reduces multiple identical data values to a smaller number of data values, and variable length encoding circuitry, which assigns shorter code words to more frequently occurring data values and longer code words to less frequently occurring data values. The output data values provided by the variable length code circuitry 120 are applied to a FIFO memory 122.

The data provided by the variable length code circuitry 120 is inherently bursty. Data values are only provided when the circuitry 120 has a block of data to encode and even then, the amount of data provided depends on the efficiency with which the circuitry can encode the data.

Data is entered into the FIFO memory using a clock signal BCK provided by the variable length code circuitry 120. This signal has one pulse per data value during the bursts of data provided by the coder 120. Data is read from the Fifo 122 using an auxiliary read clock (ARCK) signal.

The high definition video signal 110 is written into the FIFO memory 124 using a main write clock (MWCK) signal and read from the FIFO 124 using a main read clock (MRCK) signal. The signals MWCK and AWCK have substantially the same frequencies as do the signals RCK and WCK generated by the clock generator 134.

In the exemplary embodiment of the invention, the clock generator 134 produces the write clock signal WCK having substantially the same frequency as the sampling clock signal used by the HDTV video signal 110 and produces the read clock signal RCK having a frequency determined by a resonant crystal 135. The signal MWCK is has the same frequency as the signal WCK and the signals MRCK and ARCK have the same frequency as the signal RCK. The difference in frequency between the signals WCK and RCK is related to the difference between the maximum data rate supported by the HDTV video signal and the maximum data rate which may be recorded on the digital VCR.

As described above the data rate for the HDTV video signal is approximately 18 MHz, while an exemplary data rate which may be recorded on the digital VCR is approximately 25 MHz. By speeding up the data stream representing the HDTV video signal from a data rate of 18 MHz to a data rate of 25 MHz, gaps are made available in the data stream for recording an auxiliary data stream representing the low resolution image.

In the first exemplary embodiment of the invention, the controller 132 determines when to switch between the main, HDTV video signal and the auxiliary, low resolution video signal. The controller 132 monitors the main address (MAD) used to write data into the FIFO 124 and the auxiliary address (AAD) used to write data into the FIFO 122 in order to determine when to switch between the two data streams. The signal MAD indicates the space available in the FIFO 124 and the signal ADD indicates that a fixed-size block of low-resolution data is ready to be inserted into the data stream. When the signal MAD indicates that sufficient space exists in the FIFO 124 to store the largest number of HDTV signal that could be provided while the low-resolution block is added to the data stream, the controller 132 conditions the multiplexer 130 to switch to provide the low-resolution block.

In this instance, the controller 132 first switches to provide, as its output signal MV, an auxiliary header word (A HEAD) from digital values source 128 and then to provide a block of digital values from the FIFO 122 at the read clock rate (ARCK). When the block of auxiliary video data has been provided the controller 132 switches back to the main video signal by first causing the multiplexer 132 to provide the main header word (M HEAD) from the digital value source 126 and then to provide the contents of the FIFO 124 at the read clock rate (MRCK). Thus the output signal MV produced by the multiplexer 130 includes interleaved data blocks representing the main, high definition video signal and the auxiliary, reduced resolution video signal. This signal is processed by the VCR as described below with reference to FIG. 4.

Figure 2:
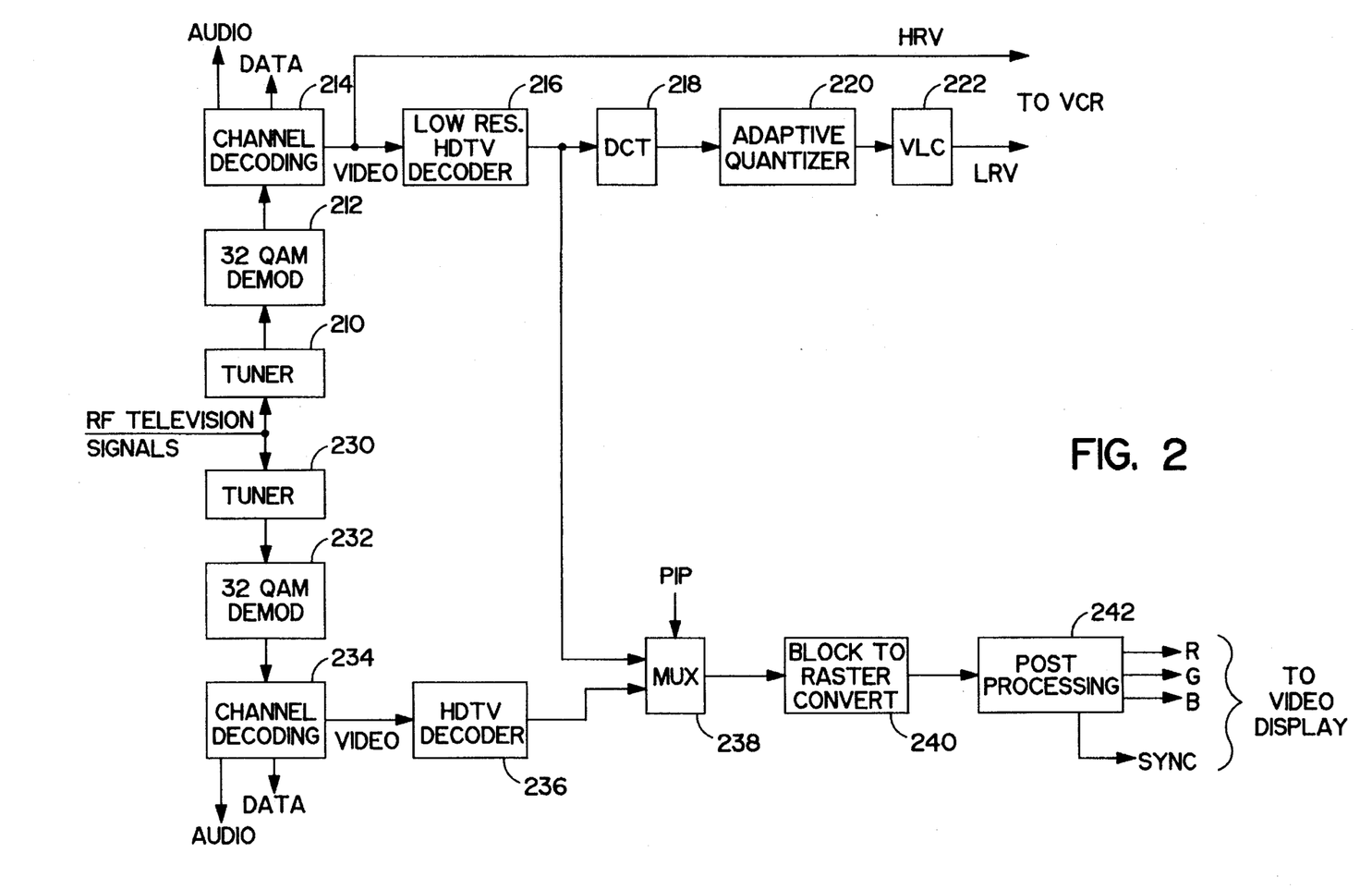
FIG. 2 is a block diagram of a television receiver which includes an alternate embodiment of the invention.

FIG. 2 is a block diagram of a television receiver which includes an alternative embodiment of the present invention. This receiver includes two tuners so that the signal for one television program may be displayed on the video display device (not shown) while a signal for another television program is supplied to the VCR for recording, both in high definition and low definition modes. In addition the circuitry shown in FIG. 2 allows the low definition video signal to be displayed as a small inset picture in the main video signal (i.e. as a part of a picture-in-picture display).

In the circuitry shown in FIG. 2, RF television signals, for example, from a wideband amplifier (not shown) are applied in parallel to a main tuner 230 and to an auxiliary tuner 210. Tuner 230 selects the main television signal from the RF television signals and demodulates the main signal to produce a baseband modulated digital signal. The signal produced by the tuner 230 is applied to a 32 QAM demodulator 232. The demodulator 232 produces a digital data stream from the baseband signal provided by the tuner 230. This signal is then applied to channel decoding circuitry 234.

The circuitry 234 may include, for example, error correction circuitry (not shown) as well as circuitry (not shown) which separates the audio, video and data signal components from the HDTV video signal. The video signal produced by the decoding circuitry 234 is applied to a conventional HDTV decoder 236. This decoder may be identical to the decoder 112 shown in FIG. 1.

As described above, the output of the HDTV decoder 236 are successive blocks of pixel values representing a high definition television image. These blocks are applied to one data input port of a multiplexer 238. The other input port of the multiplexer 238, as described below, is coupled to receive blocks of pixel values representing a low resolution image.

The multiplexer 238 is controlled by a signal, PIP, to pass the high definition blocks from the decoder 236 when a high definition image is to be displayed and to pass the low resolution blocks when a reduced resolution image (i.e. an inset picture-within-a-picture is to be displayed). The signal PIP may be generated by conventional circuitry (not shown) which controls the substitution of blocks of pixel values from the reduced resolution image for blocks of the high-definition image to produce a composite image in which the low-resolution image is displayed as an inset in the high-definition image.

The pixel blocks provided by the multiplexer 238 are applied to a block to raster converter 240. As described above the converter 240 transforms the blocks of pixel values into a sequence of data values representing a raster-scanned image. The values provided by the converter 240 are applied to post processing circuitry 242. This circuitry may be identical to the post processing circuitry 138 described above with reference to FIG. 1. It produces R, G, B and SYNC signals which control the video display device to reproduce the HDTV image of the main channel with an inset picture from the auxiliary channel.

In the auxiliary channel the RF television signals are applied to a tuner 210, 32 QAM demodulator 212 and channel decoding circuitry 214 which may be identical to the corresponding circuitry 230, 232 and 234 described above. The signal selected by the auxiliary tuner 210, however, may be different from that selected by the tuner 230.

Figure 4:
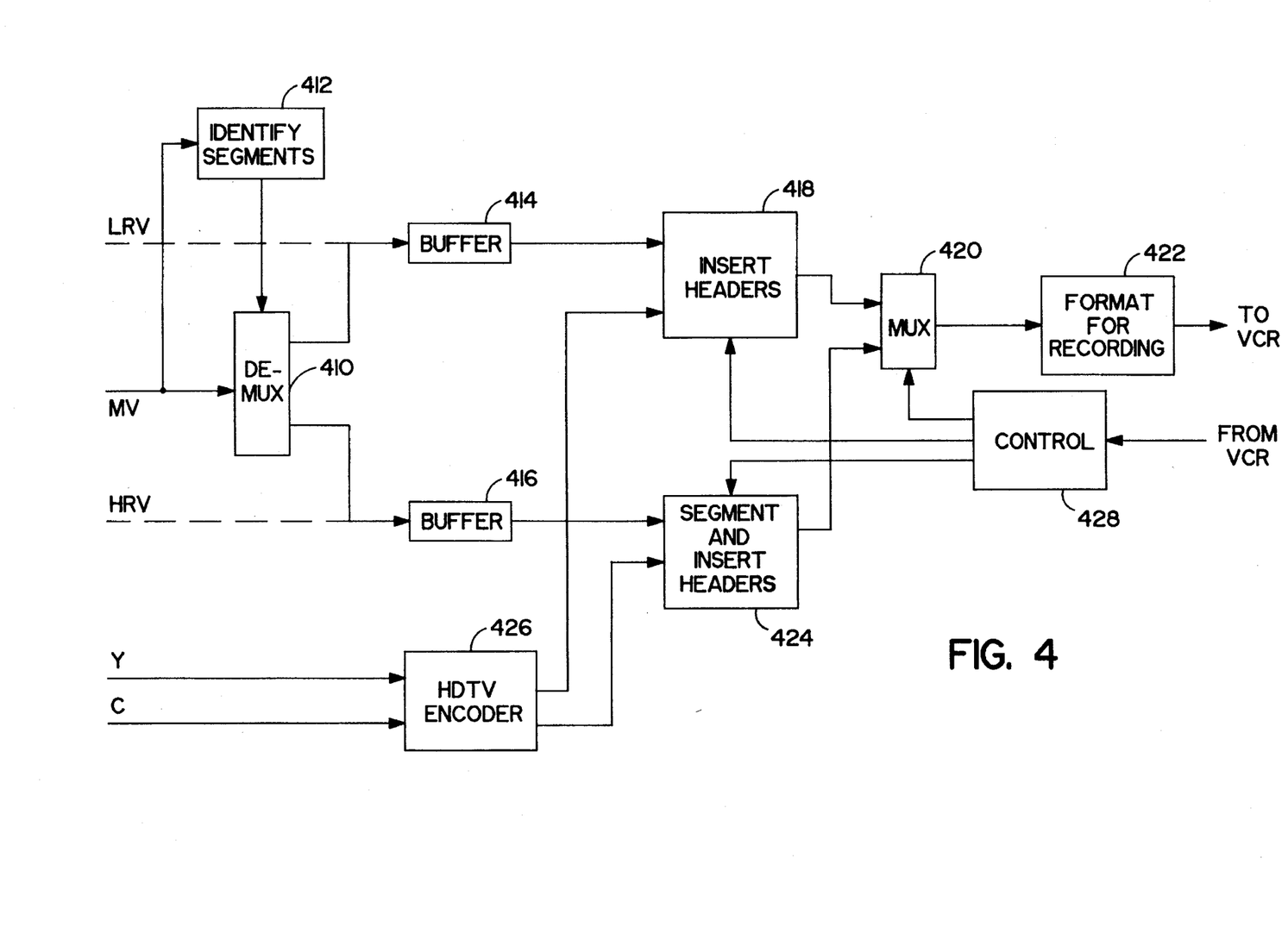
FIG. 4 is a block diagram of recording circuitry for a VCR suitable for use with the present invention.

The output signal of the channel decoding circuitry 214 is a high resolution signal HRV which, as described below with reference to FIG. 4, is applied to one of two parallel input ports of a digital VCR. This signal is also applied to a low resolution HDTV decoder 216. The decoder 216 processes the video signal to produce blocks of samples representing a reduced resolution image.

In the exemplary embodiment of the invention, this low resolution image has approximately one-half the resolution of the HDTV image in both the vertical and horizontal directions. Exemplary circuitry suitable for use as the decoder 216 is described below with reference to FIG. 3.

The low resolution blocks of pixels produced by the decoder 216 are applied to the second signal input terminal of the multiplexer 238 described above. These pixel blocks are also applied to a discrete cosine transform processor 218. The circuit 218 generates blocks of coefficient values representing the magnitude of respectively different spatial frequency components of the reduced resolution image.

These coefficient values are then applied to a quantizer 220 which encodes the coefficient values according to respectively different fixed quantization factors based on their respective spatial frequencies. In the exemplary embodiment of the invention, the higher the spatial frequency represented by the coefficient value the fewer number of bits are allowed to represent the value by the quantizer 220.

The quantized coefficients provided by the circuitry 220 are then applied to a variable length coder 222. In the exemplary embodiment of the invention, this encoder may be identical to the encoder 120 described above. The output signal of the encoder 222 is the signal LRV which is applied to the second input port of the VCR.

It is noted that while the signal HRV may include both intra-frame encoded pixel values and predictively encoded pixel values, the signal LRV includes only intra-frame coded values. These values are easier to decode because they do not require corresponding values from a previous frame.

Figure 3:
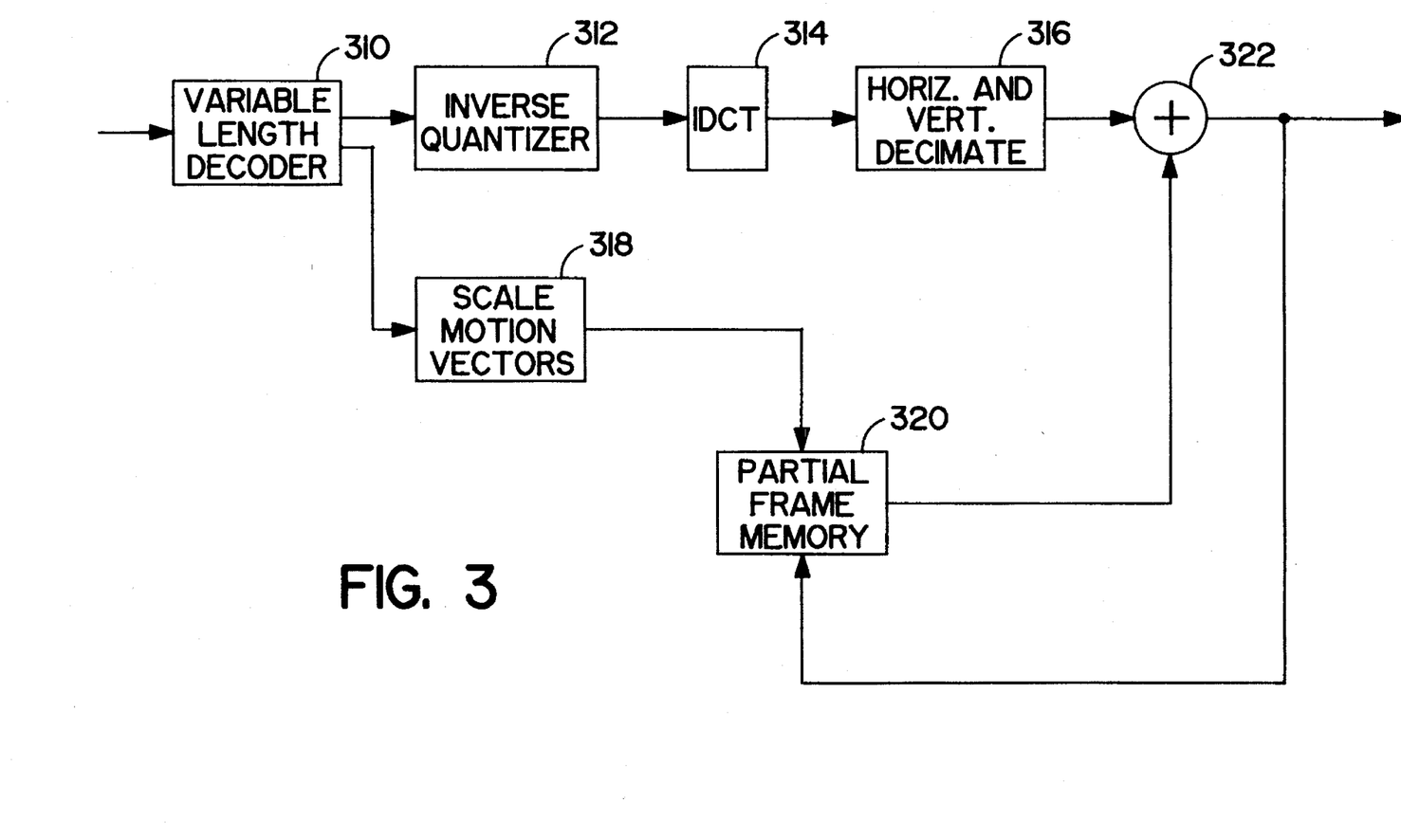
FIG. 3 is a block diagram of a low resolution HDTV decoder suitable for use in the television receiver shown in FIG. 2.

FIG. 3 is a block diagram of circuitry suitable for use as the low resolution HDTV decoder 216 shown in FIG. 2. In this circuitry the signal HRV is applied to a variable length decoder 310. The exemplary decoder 310 which, in this exemplary embodiment of the invention assumes that the signal has been encoded according to the MPEG standard, reverses the variable length and run length coding operations.

The decoder 310 produces two output signals, a decompressed digital data stream representing quantized DCT coefficients and data values representing motion vectors. The motion vectors are used to decode pixel values which were encoded using motion compensated encoding techniques. The quantized DCT coefficients are applied to an inverse quantizer 312. This quantizer reverses the adaptive quantization which was performed as part of the MPEG encoding algorithm.

The inverse quantizer 312 produces blocks of data values representing respectively different spatial frequency components of the high definition television signals. These components are applied to inverse discrete cosine transform circuitry 314 which processes the coefficient values to reproduce the underlying pixel values. The blocks of pixel values provided by the inverse DCT circuitry 314 are applied to circuitry 316 which decimates the blocks horizontally and vertically to reduce their resolution by a factor of one-half. The reduced pixel blocks provided by the circuitry 316 are then applied to one input port of an adder 322.

The other input port of the adder is coupled to receive corresponding pixel values from a partial frame memory 320, as determined by the motion vectors retrieved from the digital data stream by the variable length decoder 310. In the exemplary embodiment of the invention, since the image blocks are decimated by one-half both vertically and horizontally, the motion vectors provided by the circuitry 310 are scaled in circuitry 318 so that they will point to corresponding image data stored in the partial frame memory 320.

Thus the blocks of pixel values provided by the partial frame memory 320 correspond, to within the resolution of the scaled motion vectors, to the blocks of pixel values provided by the circuitry 316. As described above, the motion vectors in the encoded data stream point to blocks of pixel values which serve as base values for blocks of pixel values that are encoded using motion-compensated differential encoding techniques.

Both the base blocks of pixel values and the decoded differential pixel values are summed by the adder 322 to produce blocks of reduced resolution video image pixel values. These values are then stored in the partial frame memory 320. As described above the adder 322 applies its output signal in parallel to the DCT circuitry 218 and to the second data input port of the multiplexer 238 as shown in FIG. 2.

FIG. 4 is a block diagram of circuitry suitable for use in a digital VCR which records the high definition and low resolution signals provided by the television receivers shown in FIGS. 1 and 2.

If the signal is provided as a single multiplexed digital data stream, as in the television receiver shown in FIG. 1, the multiplexed signal MV is applied in parallel to a demultiplexer 410 and to circuitry 412 which identifies the various data segments in the multiplexed data stream. The circuitry 412 identifies the segments by recognizing the main and auxiliary header words M HEAD and A HEAD. The circuitry 412 controls the demultiplexer 410, causing it to provide data representing the high resolution image to a buffer 416 and data representing the low resolution image to a buffer 414. Alternatively, if the signals HRV and LRV representing the respective high resolution and low resolution images are provided in parallel, as in the circuitry shown in FIG. 2, they may be received directly by the buffers 416 and 414, respectively, as shown by the broken-line signal paths in FIG. 4.

In the exemplary embodiment of the invention the demultiplexer 410 also acts to remove the headers M HEAD and A HEAD which were inserted by the multiplexer 130 shown in FIG. 1. Consequently the data stream stored in the buffer 416 is the encoded HDTV signal 110 as shown in FIG. 1. In the same manner the data values stored in the buffer 414 represent a reduced resolution video image which has been encoded using intra-frame coding techniques.

The encoded low resolution signal provided by the buffer 414 is applied to a circuit 418 which segments the data into relatively small blocks, that may be fixed in length, and inserts header information at the start of each block. The data representing the low resolution signal is segmented such that the pixel values represented by each block may be reproduced without reference to any other block. If a segment is larger than needed to hold a compressed block, the remaining space in the segment is padded with dummy data values. Alternatively, the compressed low resolution segments may be variable in length up to a fixed maximum length. In this instance, the length of the low resolution segment may be stored in the segment header. As described below, if the encoded low-resolution segment is too long to be completely recovered by the tape head in trick-play mode, the pixel values represented by the missing data are reconstructed using conventional error concealment techniques.

The data values representing the high resolution image are retrieved by circuitry 424 from the buffer 416. The circuitry 424 divides the data values into segments and, optionally, inserts header information at the start of each segment.

In the exemplary embodiment of the invention each segment of the low resolution data desirably represents a portion of an image which may be decoded without reference to any other segment. That is to say, each segment of the low resolution data represents an independent slice of the low resolution image.

The segments of the high resolution image are not so limited. Since data in these segments is recombined before the high resolution image is displayed, as described below with reference to FIG. 5, a slice of the high resolution image may be split across multiple high resolution data segments. The segments produced by the circuitry 424 are applied to one signal input port of a multiplexer 420, the other signal input port of which is coupled to receive segments of the reduced resolution image provided by the circuitry 418.

The circuits 418, 420 and 424 are all under control of circuitry 428 which is responsive to signals provided by the VCR recorder (not shown) to alternately apply segments of the high definition and low resolution image data to achieve a predetermined pattern on the tape. Exemplary patterns are described below with reference to FIGS. 6, 7 and 8.

The output signal of the multiplexer 420 is applied to circuitry 422 which formats the data values for recording. The circuitry 422 may include, for example, an error correction code (ECC) encoder (not shown), a channel encoder (not shown) and a recording amplifier (not shown).

The control signals received by the circuitry 428 from the recording apparatus allow the encoder shown in FIG. 4 to position the segments of the high resolution video information and the reduced resolution video information at predetermined locations in each track on the tape.

In addition to recording externally supplied encoded HDTV signals, the circuitry shown in FIG. 4 allows high definition luminance (Y) signals and chrominance (C) signals to be encoded and recorded. The Y and C signals are produced, for example, by a high definition video camera, and are applied to an HDTV encoder 426. The output signal of the encoder 426 is applied as an alternate input to the circuitry 424 which segments the data and inserts header information.

In the exemplary embodiment of the invention the HDTV encoder 426 uses only intra-frame encoding techniques. This circuitry also includes a second output port which provides a low resolution version of the image data. This image data may be provided, for example, by zeroing the high frequency coefficients in both the horizontal and vertical directions in the coefficient blocks produced by the discrete cosine transform circuitry (not shown) used in the HDTV encoder 426. After these high frequency coefficient values are zeroed, the resulting values would be quantized, run length coded, and variably length coded as in the MPEG standard. This low resolution output signal is applied as an alternate input to the circuitry 418 which inserts the header values in the low resolution image segments.

Although the exemplary embodiment of the invention describes the HDTV encoder 426 as using only intra-frame encoding techniques, it is contemplated that the encoder may use both intra-frame and motion compensated encoding techniques. In this instance, the encoder 426 would also provide a low-resolution intraframe encoded output signal to the circuitry 418.

Figure 5:
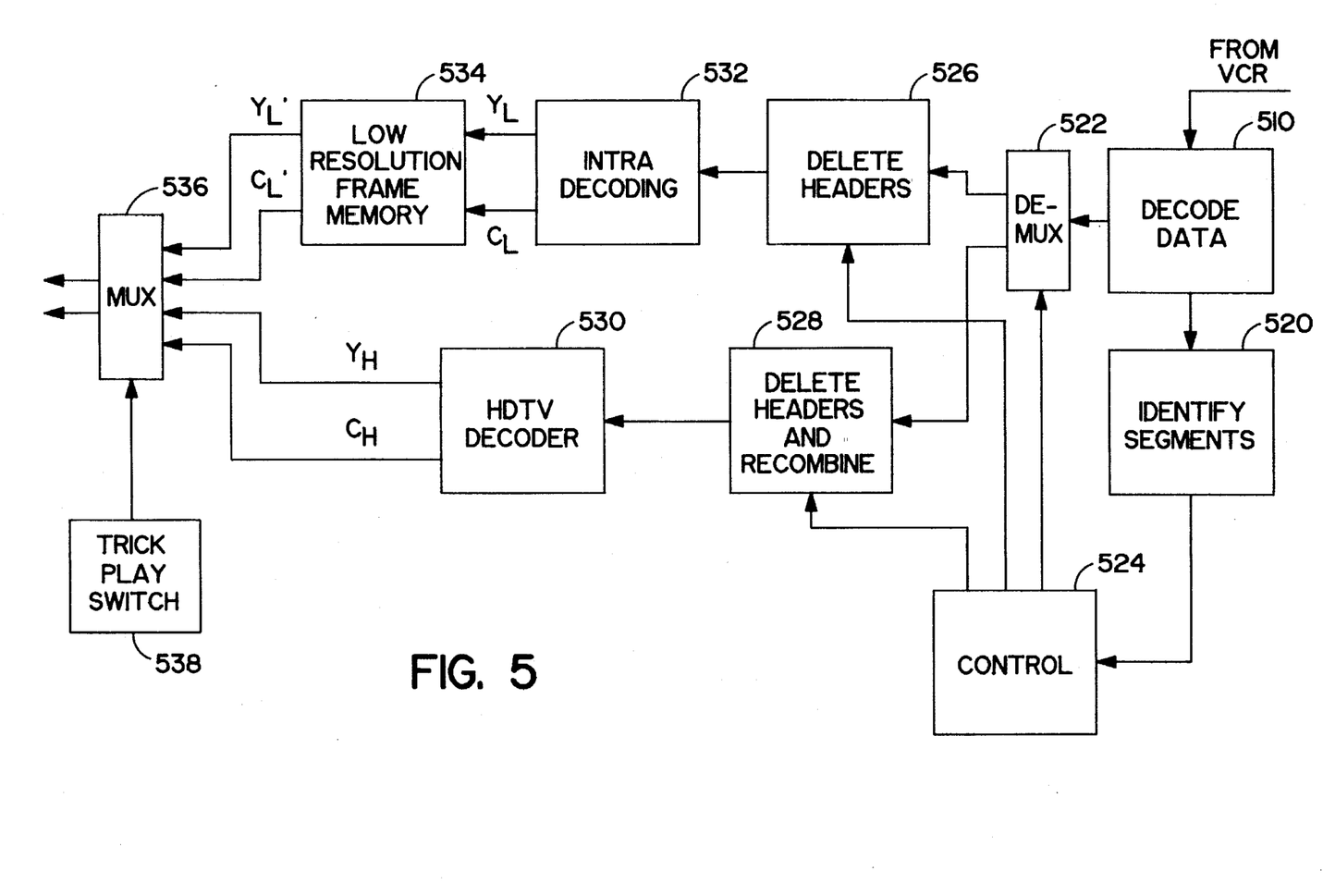
FIG. 5 is a block diagram of replay circuitry for the VCR shown in FIG. 4.

FIG. 5 is a block diagram of circuitry in the VCR which recovers the data from the tape and provides either the high resolution HDTV signal or the low resolution signal for display, based on the position of a trick-play switch 538.

In the processing circuitry shown in FIG. 5, data from the tape is provided to circuitry 510 which decodes the data to reproduce digital values. The decoder circuitry 510 may include, for example, a head amplifier (not shown), a detector (not shown) and a ECC decoder (not shown). Digital values provided by the circuitry 510 are applied to a demultiplexer 522. In addition, the circuitry 510 provides signals to a circuit 520 which recognizes header information in the recorded data stream and identifies segments of the low resolution and high resolution image signals.

In the exemplary embodiments of the invention, only the high resolution signals are processed for display in normal-play mode and only the low resolution signals are processed for display in trick-play mode. Accordingly, the trick-play switch 536 may selectively disable either the high resolution or low resolution decoding circuitry.

The segment identification information produced by the circuitry 520 is applied to control circuitry 524. The circuitry 524 produces an output signal which is applied to the control input terminal of demultiplexer 522. Responsive to this signal, demultiplexer 522 applies blocks of data representing the low resolution signal to circuitry 526 and blocks of data representing the high resolution image to circuitry 528. Under control of the circuitry 524 the circuit 526 deletes the header information from the low resolution encoded video data and applies the result to intra-frame decoding circuitry 532. The circuitry 532 reverses the intraframe encoding which was performed by the circuitry, described above with reference to FIGS. 1 and 2, to produce low resolution luminance ($Y_L$) and chrominance ($C_L$) signals. These signals are applied to a low resolution frame memory 534. This memory, which is used to convert the blocks of data to raster form, may be identical to the memory 320 described above with reference to FIG. 3. That is to say, it may contain only one-quarter of the pixel values that are contained in a conventional frame memory.

The control circuitry 524 also controls the circuit 528 causing it to delete any header information which may have been appended to the segments of high definition encoded video signal. The circuitry 528 also recombines the segments of the high-resolution image into a data stream which is substantially identical to the received base band compressed video signal shown in FIGS. 1 and 2. The signal produced by the circuitry 528 is applied to an HDTV decoder 530 which processes it to produce full resolution luminance ($Y_H$) and chrominance ($C_H$) component HDTV signals.

The signals $Y_L'$ and $C_L'$, which are retrieved from the partial frame memory 534, are applied to one pair of data input ports of a multiplexer 536 while the signals $Y_H$ and $C_H$ produced by the HDTV decoder 530 are applied to a second pair of signal input ports of the multiplexer 536. The multiplexer 536 is controlled by the trick-play switch 538 to provide the low resolution signals in trick-play display mode and to provide the high resolution signals in normal play mode. When the low-resolution signal is provided from the memory 534, it may be expanded, for example, by repeating each pixel value and each line of pixel values to generate signals representing a full-sized image.

Figure 6:
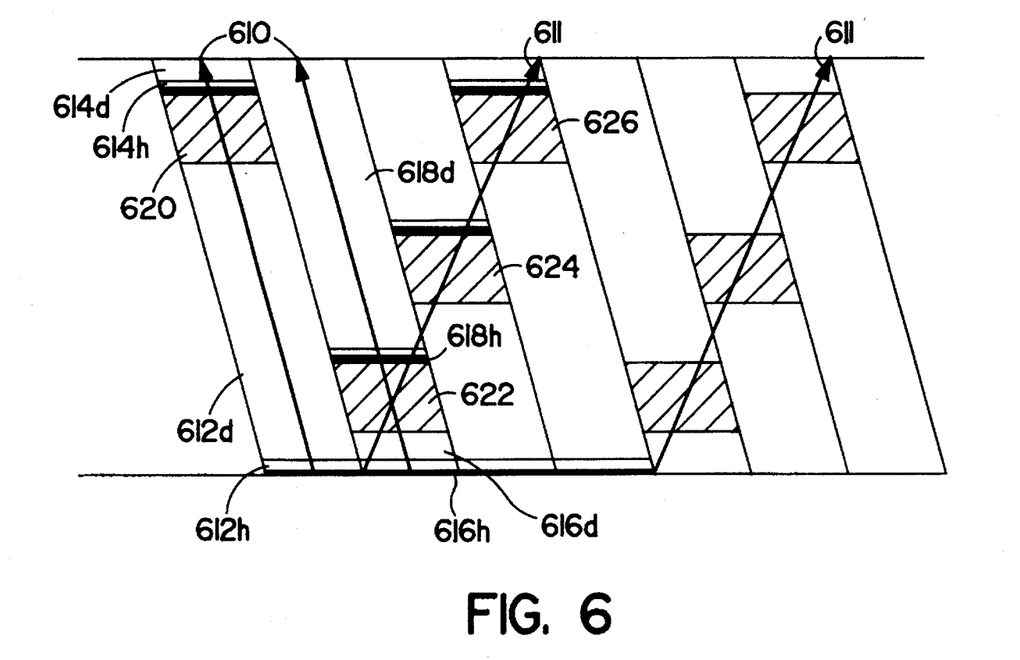
FIG. 6 is a graphical representation of a segment of video tape which is useful for explaining the VCR recording format used with the present invention.

FIG. 6 is a diagram of a segment of tape which shows an exemplary pattern for recording segments of high resolution and low resolution image data. In FIG. 6 as well as in FIGS. 7 and 8, the low resolution image data is represented by the shaded blocks, for example 620, 622 and 624 while the high resolution information is represented by the unshaded blocks for example 612, 614, 616 and 618. In FIG. 6 each of these blocks is shown as including two segments, a header segment (e.g. 612h) and a data segment (e.g. 612d). Although it is not shown, in the exemplary embodiment of the invention each of the low resolution image segments may also include a header segment. Alternatively only one of the image segments may include header information so long as this header information includes the length of the segment. In this instance, the VCR would treat any data following the defined segment length as a segment of the other type until the next header is found.

In FIG. 6 the high definition image data is contained in the data segments 612d, 614d, 616d and 618d. When the header information is removed from these segments and their data values concatenated, a conventional high resolution image data stream is produced. Interspersed among these high resolution data segments are the low resolution segments 620 and 622. During normal replay these segments are ignored by the VCR. In trick-play mode, however, when the tape head follows the path indicated by the arrow 611, only these segments are recovered.

Figure 7:
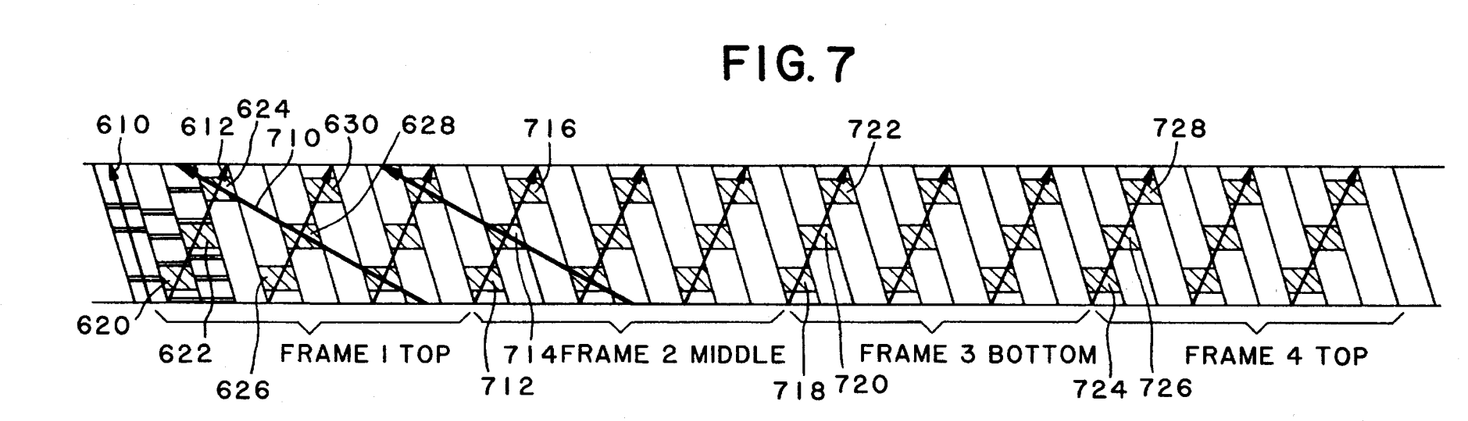
FIG. 7 is a graphical depiction of a segment of video tape which is useful for describing a first sequencing of low resolution and high resolution image data in accordance with the present invention.

In the present invention, two methods of recording low resolution image information are contemplated. These are illustrated by FIGS. 7 and 9 on the one hand and by FIGS. 8 and 10 on the other hand. FIG. 7 illustrates a segment of video tape in which only portions of each image frame are recorded for the low resolution signal. In FIG. 7 the low resolution data segments of the first nine tracks are used to record the top one-third of frame 1. The low resolution segments of the next nine tracks are used to record the middle one-third of frame 2 and the low resolution segments in the following sets of nine tracks are used to record the bottom one-third of frame 3 and then the top one-third of frame 4.

The image recovered in trick-play mode using the scheme shown in FIG. 7 is illustrated in FIG. 9. This Figure shows four successive images produced during trick-play mode. The top portion 910 of the first image is the top one-third of frame 1, the middle portion 912 is the center portion of frame 2 and the bottom of the first image is the lower portion of frame 3. In the next succeeding image these portions of frames are taken from frame 4 - 916, frame 5 - 918 and frame 6 - 920.

Figure 8:
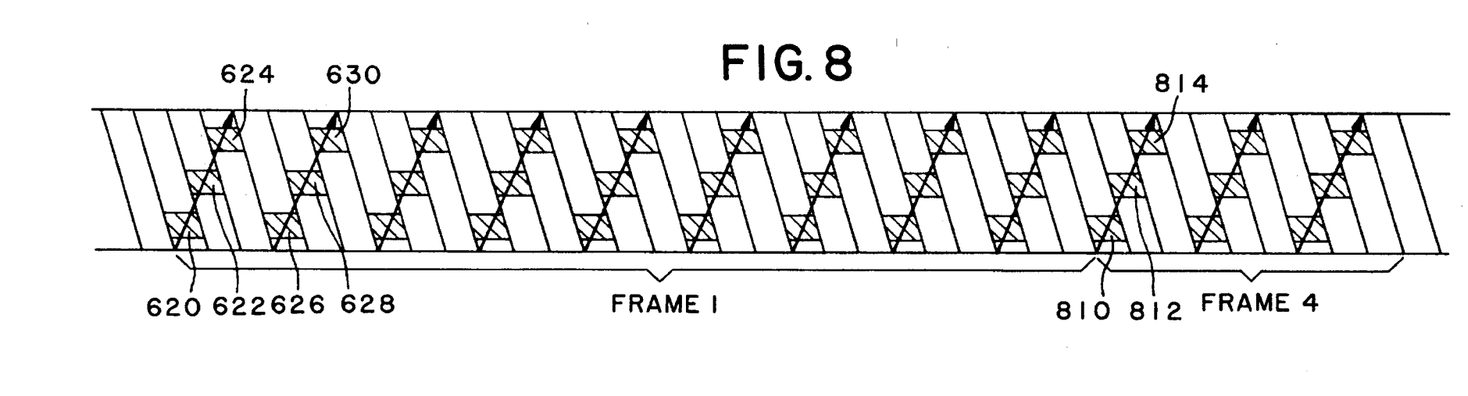
FIG. 8 is a graphical depiction of a segment of video tape which is useful for describing a second sequencing of low resolution and high resolution image data in accordance with the present invention.
Figure 9:
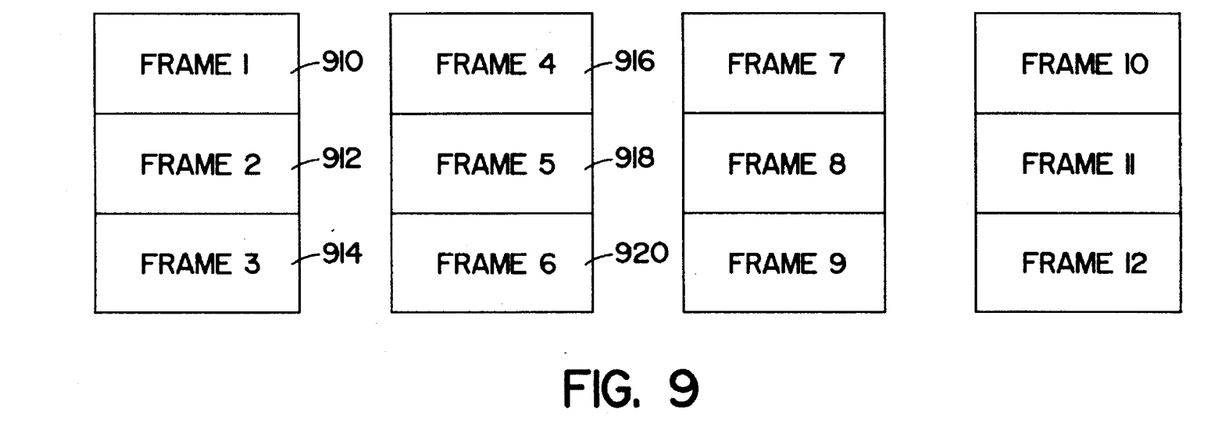
FIG. 9 illustrates a group of image frames which would be produced using the data sequencing scheme shown in FIG. 7.
Figure 10:
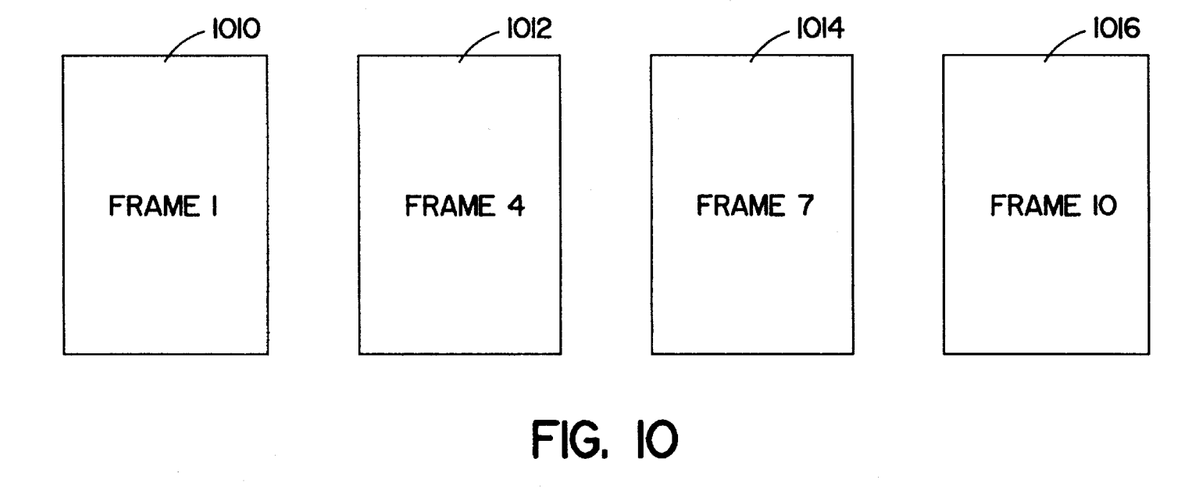
FIG. 10 illustrates of a group of frames which would be produced using the data sequencing scheme shown in FIG. 8.

Alternatively as shown in FIGS. 8 and 10, every third frame may be recorded in its entirety for recovery during trick-play mode. As shown in FIG. 8, the low resolution image segments for frame 1 would be recorded across 27 consecutive tracks, the next 27 tracks would contain the low resolution image segments for frame 4. As shown in FIG. 10, during trick-play mode, the successive frames 1010, 1012, 1014 and 1016 would correspond to frame 1, frame 4, frame 7 and frame 10 of the high resolution image. During replay in trick-play mode, since only every third frame would be displayed, the reproduced image would appear to be increased in speed by a factor of three.

Another aspect of the invention concerns the relative timing of the low resolution and high resolution images as they are recorded on tape. In the embodiments described above the low resolution image receives considerable processing in the television receiver while the high resolution is passed with relatively little processing. Accordingly, frames of the high resolution image may be recorded on the tape before corresponding frames at the low resolution image.

Since the trick-play modes are generally perceived as providing only an approximate location on the tape, this difference in display timing should not be a problem.

It may be desirable however to modify this timing so that the low resolution image frames are recorded on the tape prior to the high resolution frames. The low resolution signal may then be used as a preview signal for the high resolution signal. This may be useful for editing features in the VCR, allowing an operator, during normal play modes, to recover both high resolution and low resolution images and to view the low resolution versions of upcoming frames while transferring high resolution image data for the current frame.

With reference to FIG. 1, a delay of the type contemplated here may be implemented by increasing the size of the FIFO memory 124. In the embodiment of the invention shown in FIG. 2, the realignment of the main and auxiliary video signals may be implemented by inserting a delay element (not shown) in the path between the output of channel decoding circuitry 214 and signal HRV applied to the VCR.

While the invention has been described in terms of an exemplary embodiment it is contemplated that it may be practiced as outlined above within the spirit and scope of the appended claims.

The invention claimed is:

1. A high-definition television receiver capable of decoding a high-definition video signal that was encoded using both intra-frame and predictive encoding techniques comprising:

means for receiving the encoded high-definition video signal;

decoding means for decoding the encoded high-definition video signal to produce a decoded digital signal representing a high-definition video image;

decimating means, responsive to the decoded digital signal, for decreasing the number of samples in the decoded digital signal to produce a decimated video signal representing a video image having a reduced number of picture elements;

means for encoding the decimated video signal, using intra-frame encoding techniques to the relative exclusion of predictive encoding techniques, to produce an encoded low-resolution video signal which is independent of the encoded high-definition video signal; and output means for providing both the encoded high-definition video signal and the encoded low-resolution video signal.

2. A television receiver according to claim 1, wherein:

the encoded high-definition video signal is encoded using both intra-frame and predictive encoding techniques;

the decimating means reduces the number of samples in the decimated video signal by a factor of one-fourth relative to the decoded digital signal.

3. A high-definition video signal processing apparatus capable of decoding a high-definition video signal that was encoded using both intra-frame and predictive encoding techniques comprising:

means for receiving the encoded high-definition video signal;

decoding means for decoding the encoded high-definition video signal to produce a decoded digital signal representing a high-definition video image;

decimating means, responsive to the decoded digital signal, for decreasing the number of samples in the decoded digital signal to produce a decimated video signal representing a video image having a reduced number of picture elements;

means for encoding the decimated video signal, using intra-frame encoding techniques to the relative exclusion of predictive encoding techniques, to produce an encoded low-resolution video signal;

output means for providing both the encoded high-definition video signal and the encoded low-resolution video signal;

a video tape recorder (VTR), having at least one trick-play mode, coupled to receive the encoded high-definition video signal and the encoded low-resolution video signal provided by the output means, the VTR including:

means for separating each of the encoded high-definition video signal and the encoded low-resolution video signal into respective segments;

means for interleaving ones of the segments of the high-definition video signal with respective ones of the segments of the encoded low-resolution video signal to produce a combined signal;

means for recording the combined signal on the video tape such that a substantial portion of the encoded low-resolution signal is recovered by the VTR in the trick-play mode.

4. A high-definition video signal processing apparatus according to claim 3, further including:

means, coupled to the decoding means and including a display device, for processing the decoded digital signal to reproduce the high-definition video image on the display device.

5. A high-definition video signal processing apparatus according to claim 3, further including:

means for receiving a further encoded high-definition video signal;

further decoding means for decoding the further encoded high-definition video signal to produce a further decoded digital signal representing a further high-definition video image; and means, coupled to receive the further decoded digital signal and the decimated video signal for processing the received signals to reproduce the high-definition video image on the display device and to reproduce the reduced resolution video image as an inset in the high-definition video image.

6. A high-definition television receiver and recorder which facilitates image reproduction in trick-play modes comprising:

means for receiving a high-definition video signal which was encoded using both intra-frame and predictive encoding techniques comprising:

decoding means for decoding the encoded high-definition video signal to produce a decoded digital signal representing a high-definition video image;

decimating means, responsive to the decoded digital signal, for decreasing the number of samples in the decoded digital signal to produce a decimated video signal representing a video image having a reduced number of picture elements;

means for encoding the decimated video signal, using intra-frame encoding techniques to the relative exclusion of predictive encoding techniques, to produce an encoded low-resolution video signal;

a video tape recorder (VTR), having at least one trick-play mode, coupled to receive the encoded high-definition video signal and the encoded low-resolution video signal, the VTR including:

means for separating each of the encoded high-definition video signal and the encoded low-resolution video signal into respective segments;

means for interleaving ones of the segments of the high-definition video signal with respective ones of the segments of the low-resolution video signal to produce a combined signal;

means for recording the combined signal on the video tape such that a substantial portion of the encoded low-resolution signal is recovered by the VTR in the trick-play mode.

7. A high-definition television receiver and recorder according to claim 6 further comprising:

means for receiving a further encoded high-definition video signal;

further decoding means for decoding the further encoded high-definition video signal to produce a further decoded digital signal representing a further high-definition video signal; and means, coupled to receive the further decoded digital signal and the low-resolution video signal, for processing the received signals to reproduce the high-definition video image on the display device and to reproduce the reduced resolution video image as an inset in the high-definition video image.

8. A television receiver and recorder according to claim 7, wherein:

the decimating means reduces the number of samples in the decimated video signal by a factor of one-fourth relative to the decoded digital signal.

\* \* \* \* \*